United States Patent [19]
McEwan

[11] Patent Number: 5,589,838
[45] Date of Patent: Dec. 31, 1996

[54] SHORT RANGE RADIO LOCATOR SYSTEM

[75] Inventor: Thomas E. McEwan, Livermore, Calif.

[73] Assignee: The Regents of the University of California, Oakland, Calif.

[21] Appl. No.: 510,979

[22] Filed: Aug. 3, 1995

Related U.S. Application Data

[63] Continuation-in-part of Ser. No. 300,909, Sep. 6, 1994.

[51] Int. Cl.$^6$ .................................................. G01S 1/24
[52] U.S. Cl. ..................... 342/387; 342/457; 342/463; 342/465
[58] Field of Search ................................... 342/457, 465, 342/463, 387

[56] References Cited

U.S. PATENT DOCUMENTS

| | | | |
|---|---|---|---|
| 3,680,121 | 7/1972 | Anderson et al. | 343/112 TC |
| 3,687,556 | 8/1972 | Price et al. | 356/152 |
| 3,714,573 | 1/1973 | Grossman | 325/32 |
| 3,789,410 | 1/1974 | Smith et al. | 343/112 D |
| 3,886,553 | 5/1975 | Bates | 343/112 R |
| 3,953,856 | 4/1976 | Hammack | 343/112 D |
| 4,114,155 | 9/1978 | Raab | 343/105 R |
| 4,161,730 | 7/1979 | Anderson | 343/6.5 R |
| 4,543,580 | 9/1985 | Bent et al. | 343/460 |
| 4,916,455 | 4/1990 | Bent et al. | 342/457 |
| 5,216,429 | 6/1993 | Nakagawa et al. | 342/450 |
| 5,317,323 | 5/1994 | Kennedy et al. | 342/457 |

Primary Examiner—Thomas H. Tarcza
Assistant Examiner—Dao L. Phan
Attorney, Agent, or Firm—Henry P. Sartorio; Richard B. Main

[57] ABSTRACT

A radio location system comprises a wireless transmitter that outputs two megahertz period bursts of two gigahertz radar carrier signals. A receiver system determines the position of the transmitter by the relative arrival of the radar bursts at several component receivers set up to have a favorable geometry and each one having a known location. One receiver provides a synchronizing gating pulse to itself and all the other receivers to sample the ether for the radar pulse. The rate of the synchronizing gating pulse is slightly offset from the rate of the radar bursts themselves, so that each sample collects one finely-detailed piece of information about the time-of-flight of the radar pulse to each receiver each pulse period. Thousands of sequential pulse periods provide corresponding thousand of pieces of information about the time-of-flight of the radar pulse to each receiver, in expanded, not real time. Therefore the signal processing can be done with relatively low-frequency, inexpensive components. A conventional microcomputer is then used to find the position of the transmitter by geometric triangulation based on the relative time-of-flight information.

5 Claims, 4 Drawing Sheets

SHORT RANGE RADIO LOCATOR SYSTEM

The United States Government has rights in this invention pursuant to Contract No. W-7405-ENG-48 between the United States Department of Energy and the University of California for the operation of Lawrence Livermore National Laboratory.

COPENDING APPLICATION

This application is a continuation in part of U.S. patent application Ser. No. 08/300,909, filed Sep. 6, 1994, and titled, TIME-OF-FLIGHT RADIO LOCATION SYSTEM, and incorporated herein by reference.

BACKGROUND OF THE INVENTION

1. Field of the Invention

The present invention relates to navigation and location systems and more particularly to short-range wireless ultra-wideband (UWB) radio triangulation systems.

2. Description of Related Art

The ancient art of land surveying involves the determination of an unknown position from angular and distance measurements taken from one or more reference positions. The global positioning system (GPS) operated by the United States Department of Defense depends on measuring the time-of-flight of microwave radio signals from three or more orbiting satellite transmitters by a navigation receiver that computes the position of the user. The locating of mobile units in a region by radio triangulation is well-known, for example one artisan has suggested locating police units for a city dispatcher. Anderson, et al., describe in U.S. Pat. No. 3,680,121, issued Jul. 25, 1972, a locator system for a vehicle having an unknown location that transmits a short modulated radio frequency pulse. Receivers in the area compare the received signal with a standard time reference signal. The phase difference with the reference time is used to determine the arrival time differences. A time reference accurate to one or two microseconds is required to be provided to four receivers in a geographic area. A local television broadcast signal is said to be an adequate source of such a timing reference.

At their very basic level, radar systems transmit radio frequency pulses and measure the time that reflections of the transmitted signal take to be reflected back. The flight time is a measure of the distance from the radar unit to the reflecting objects. Highly directional antennas allow such transmissions and signal reflections back to be narrowly focused, so that the direction to such reflective objects can also be gauged.

The present inventor, Thomas E. McEwan, describes in his U.S. patent application Ser. No. 08/359,151, filed Dec. 19, 1994and incorporated herein, a short range, ultra-wideband radar with a high resolution swept range gate. A transmit timing pulse is connected to cause a radar transmitter to output a pulse. A receive timing pulse is connected to gate through a return sample from a differential receiver that eliminates spurious noises from its close proximity to the transmitter. The gated receiver signal indicates whether a reflection was detected within a narrow time window. The time window is slewed back and forth by a sweep generator to search for the detectable reflections. The exact delay of the receive timing pulse from the transmit timing pulse that produces a detectable reflection is a measure of the distance to the reflecting object, for example, four inches to as far as twenty feet.

The present inventor, Thomas E. McEwan, also describes in his U.S. patent application Ser. No. 08/359,151, filed Dec. 19, 1994, and incorporated herein, a short range, ultra-wideband radar with a high resolution swept range gate. A single timing generator is used to output both a transmit-timing pulse that triggers a radar transmitter to output a pulse and a receive-timing pulse that gates through a return sample from a differential radar receiver in close proximity to the transmitter. Pulse-by-pulse, the receive-timing pulse is varied in phase with the transmit-timing pulse in a sweep spanning milliseconds to gather thousands of pieces of time-phase information about the time it takes the radar pulse to travel out and return back from a radio-reflective object.

The parent application Ser. No. 08/300,909, filed Sep. 6, 1994, describes a system in which the transmitter is tethered by a wire. In some instances such a tethering may be objectionable. Therefore, a wireless implementation would have important advantages in particular applications.

SUMMARY OF THE INVENTION

An object of the present invention is to provide a radio location system for short-range use.

A further object of the present invention is to provide a radio location system without wire tethers to the rover unit with the unknown location.

Another object of the present invention is to provide a radio location system that can be constructed with inexpensive parts.

Briefly, a radio location system embodiment of the present invention comprises a wireless transmitter that outputs two megahertz periodic bursts of two gigahertz radar carrier signals. A receiver system determines the position of the transmitter by the relative arrival of the radar bursts at several component receivers set up to have a favorable geometry and each one having a known location. One receiver provides a synchronizing gating pulse to itself and to all the other receivers to sample the ether for the radar pulse. The rate of the synchronizing gating pulse is slightly offset from the rate of the radar bursts themselves, so that each sample collects one finely-detailed piece of information about the time-of-flight of the radar pulse to each receiver each pulse period. Thousands of sequential pulse periods provide corresponding thousands of pieces of information about the time-of-flight of the radar pulse to each receiver in expanded, not real, time. Therefore the signal processing can be done with relatively low-frequency, inexpensive components.

An advantage of the present invention is that a radio location system is provided that can determine the position of a roving wireless transmitter within a short range of several receivers.

Another advantage of the present invention is that a radio location system is provided that is accurate.

A further advantage of the present invention is that a radio location system is provided that is inexpensive to manufacture.

DETAILED DESCRIPTION OF THE INVENTION

Figure 1:
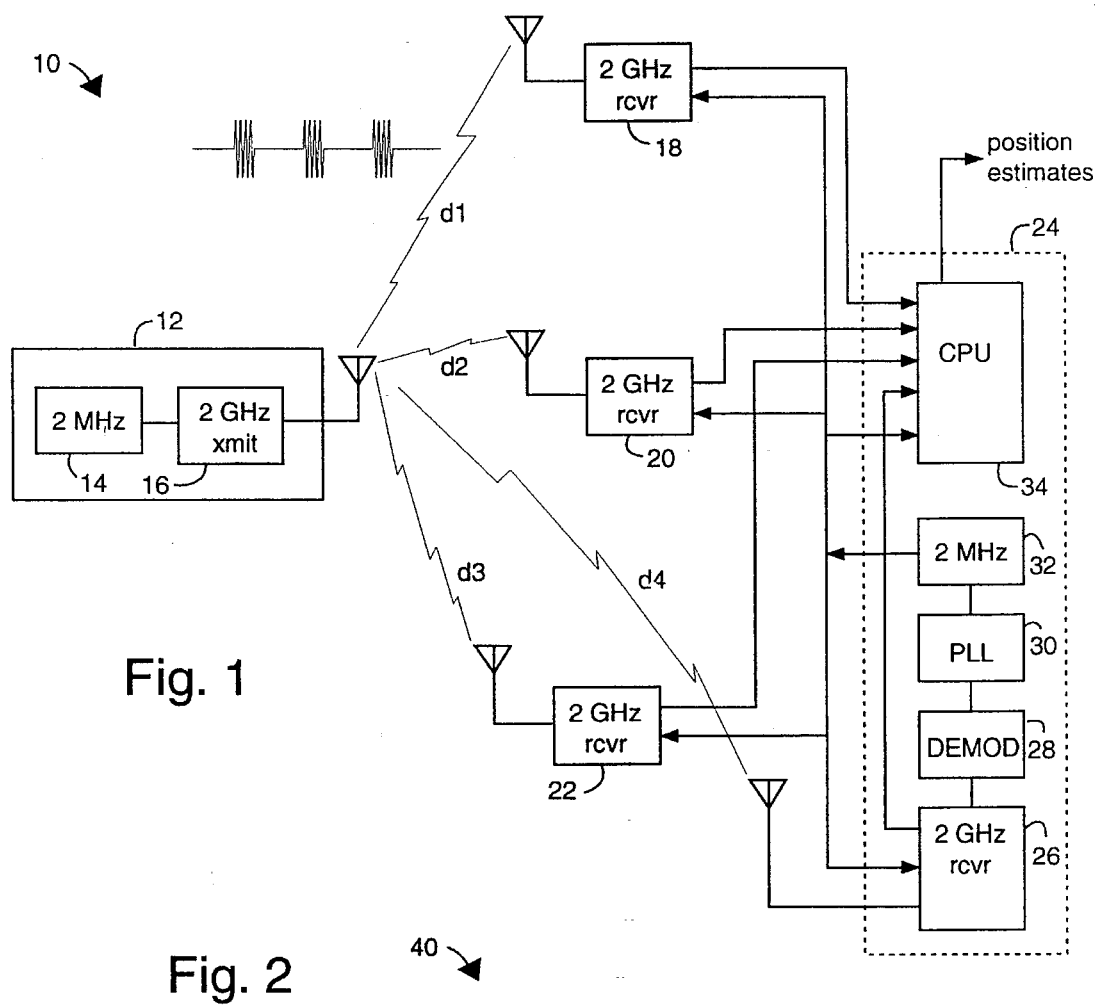
FIG. 1 is a block diagram of a short-range radio location system embodiment of the present invention.

FIG. 1 shows a short-range radio location system embodiment of the present invention, referred to herein by the general reference numeral 10. For example, the radio location system 10 operates in the range of ten to twenty feet. A rover 12 comprises a two megahertz generator 14 connected to modulate a two gigahertz radar pulse transmitter 16. The rover 12 emits short bursts of radio frequency carrier at a two megahertz repetition rate. Such transmissions traverse a distance "d1" to a receiver 18, a distance "d2" to a receiver 20, a distance "d3" to a receiver 22, and a distance "d4" to a receiver 24. The time-of-flight of the radio transmissions is about one nanosecond per linear foot. If the receivers 18, 20, 22, and 24 are all equidistant from the transmitter rover 12, the signals in each receiver will be simultaneously received. Other positions will provide different but unique timing results if the relative geometry is advantageous. Where the positions of the receivers 18, 20, 22, and 24 are known and the position of rover 12 is not known, the position of rover 12 can be determined by converting the apparent time-of-flight over each of the distances d1–d4 to a length, and then solving by triangulation, e.g., using conventional methods.

Ten feet of distance requires about ten nanoseconds for a radio frequency signal to traverse. Preferably, the distances d1–d4 are resolved to better than one percent, which means measuring the time-of-flight from the rover 12 to each receiver 18, 20, 22, and 24 to better than 100 picoseconds ($10^{-10}$). A two gigahertz radio frequency (RF) stage 26 provides a signal to a demodulator 28 that recovers the original two megahertz modulation from the two megahertz generator 14. A phase-locked-loop (PLL) 30 is used to control a variable oscillator 32, such that a two megahertz local oscillator signal locked to the rover 12 is provided with a small offset, e.g., one hundred hertz, for an output frequency of 2.000100 MHz. The PLL 30 and the variable oscillator 32 may alternatively comprise a phase detector and a numeric controlled oscillator (NCO), as are common in navigation satellite receivers, especially global positioning system (GPS) devices.

A microcomputer (CPU) 34 stores representations of which of the receivers 18, 20, 22 and 24 and what particular cycles "0 . . . n" of the two megahertz generator 14 provided a TRUE binary signal. The binary signal goes TRUE to indicate the arrival of the transmitter signal coincided with a sample gate signal from the variable oscillator 32, e.g., as introduced below, time slots 52, 56, 54 and 53, respectively, for lines 43–46 in FIG. 2. The CPU 34 can then compute from that information a relative linear distance difference from the time-of-flight of the RF carrier transmissions to each of the receivers, e.g., where the RF carrier transmission traverses the distances d1, d2, d3 and d4, at about one nanosecond per foot. A position estimate of the roving transmitter 12 can then be conventionally determined by simple triangulation from the relative difference in the distances d1, d2, d3 and d4, and from the known positions of each of the of receivers 18, 20, 22 and 24.

Figure 2:
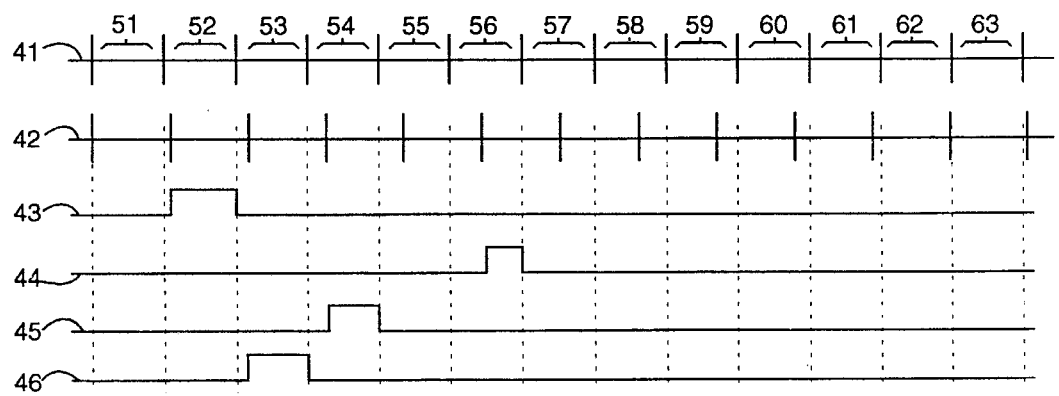
FIG. 2 is a timing diagram of particular signals in the short-range radio location system of FIG. 1.

FIG. 2 represents the timing of the two megahertz bursts from the rover 12 by a series of ticks on a line 41. The 2.000100 MHz signal timing from the variable oscillator 32 is represented by a series of ticks on a line 42. A digital output from each receiver 18, 20, 22, and 24 is represented by a respective line 43–46. Time periods are represented by a sequence of time slots 51–63. At the beginning of a first time period, a pair of ticks on lines 41 and 42 coincide in time, e.g., at the beginning of time slot 51 where the phases match. But because the 2.000100 MHz signal from the variable oscillator 32 is running a little slower than the two megahertz bursts from the rover 12, the next tick on line 42 occurs a little later than the next tick on line 41, e.g., at the beginning of time slot 52. Such slippage accumulates until the ticks once again coincide near the right ends of lines 41 and 42, e.g., time slot 63, e.g., every "n" cycles of the two megahertz bursts from the rover 12.

Each receiver 18, 20, 22, and 24 has a gate input that commands a sample of the radio ether to be taken. These gate inputs are simultaneously driven by the 2.000100 MHz signal from the variable oscillator 32. During one of the time slots 51–62, for example, each receiver 18, 20, 22, and 24 will receive its delayed copy of the transmission from the rover 12 at the same time it receives the 2.000100 MHz signal gate signal input from the variable oscillator 32. For each receiver that such a coincidence occurs, a digital logic signal is returned. The lines 43–46 represent such coincidences of timing for time slots 52, 56, 54, and 53, respectively for receivers 18, 20, 22, and 24. Ignoring the basic scale established for the two megahertz ticks, if each time slot represented one nanosecond, then FIG. 2 represents by its timing that the rover is one nanosecond from receiver 18, five nanoseconds from receiver 20, three nanoseconds from receiver 22, and two nanoseconds from receiver 24.

But the exact phase timing of line 41 is unavailable to the receivers 18, 20, 22, and 24 by definition. So, the geometry of the rover 12 to the receivers 18, 20, 22, and 24 is figured in relative terms by the present invention. That is, receiver 18 is the closest because its sample gate coincided with its receipt of the transmitted burst first. The distance from the rover 12 to the receiver 20 is four feet greater than the distance from the rover 12 to the receiver 18, e.g., d2 minus d1, where each foot is traversed each nanosecond. The distance from the rover 12 to the receiver 22 is two feet greater than the distance from the rover 12 to the receiver 18, e.g., d3 minus d1. And, the distance from the rover 12 to the receiver 24 is one foot greater than the distance from the rover 12 to the receiver 18, e.g., d4 minus d1. A simultaneous equation can then be set up and solved for the three-dimensional position of the rover 12, given the three-dimensional positions for each of the receivers 18, 20, 22, and 24. The solution will be unique and unambiguous for geometries where the receivers 18, 20, 22, and 24 are not all in the same plane.

Figure 3:
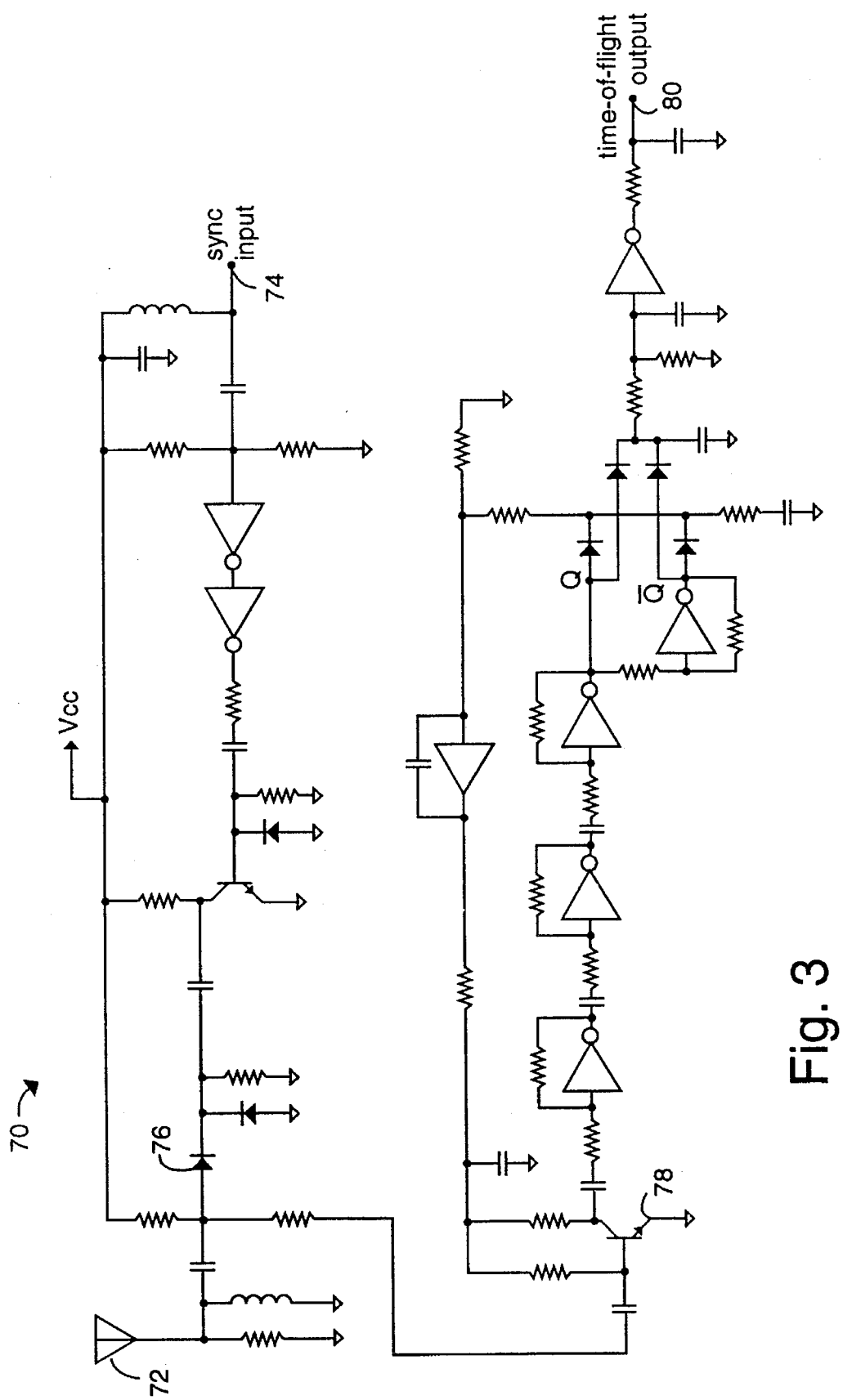
FIG. 3 is a schematic diagram of one of the receivers in the short-range radio location system of FIG. 1.

In FIG. 3, a wireless receiver 70, similar to receivers 18, 20, and 22 (FIG. 1), comprises an antenna 72 for receiving pulses, e.g., two gigahertz microwave transmissions from the transmitter 12. Such transmissions are sampled each time a synchronizing gate pulse appears at an input 74. Operating power is also supplied externally over the same input 74. A diode 76 provides radio detection and the modulation on such transmissions is amplified through to a transistor 78. If a radar transmission was received by the antenna 72 when a synchronizing gate pulse appeared at the input 74, a time-of-flight (TOF) signal will be produced on an output 80.

Figure 4:
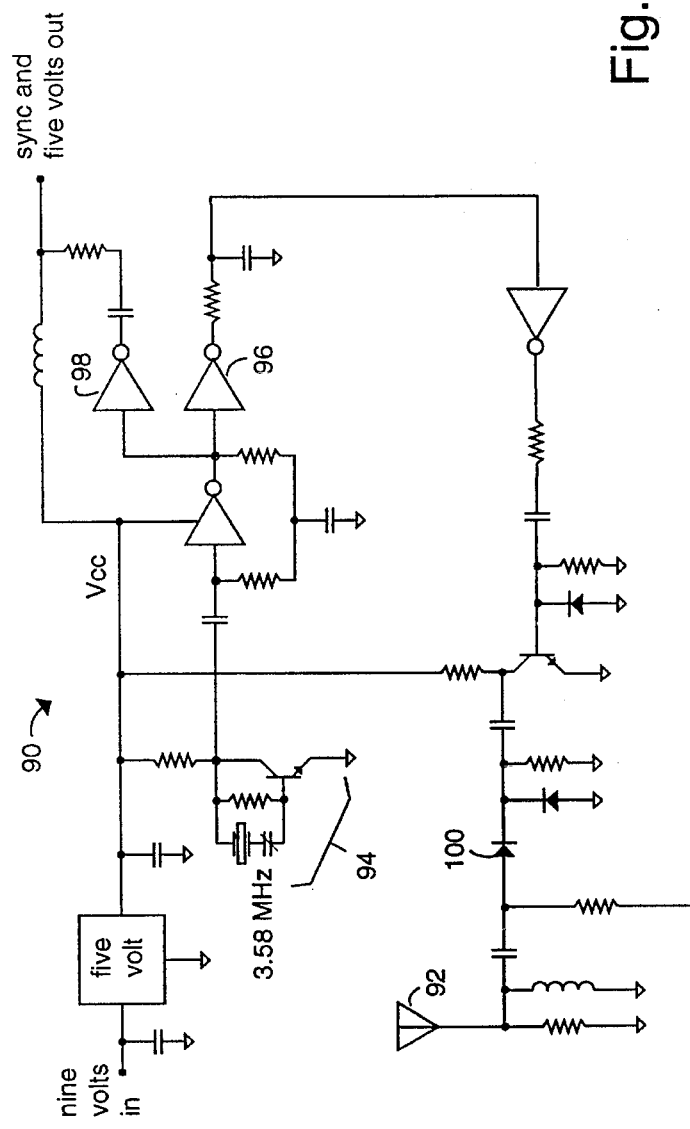
FIG. 4 is a schematic diagram of the receiver in the short-range radio location system of FIG. 1 that provides a synchronizing sample gate to the receivers of FIG. 3.
Figure 4:
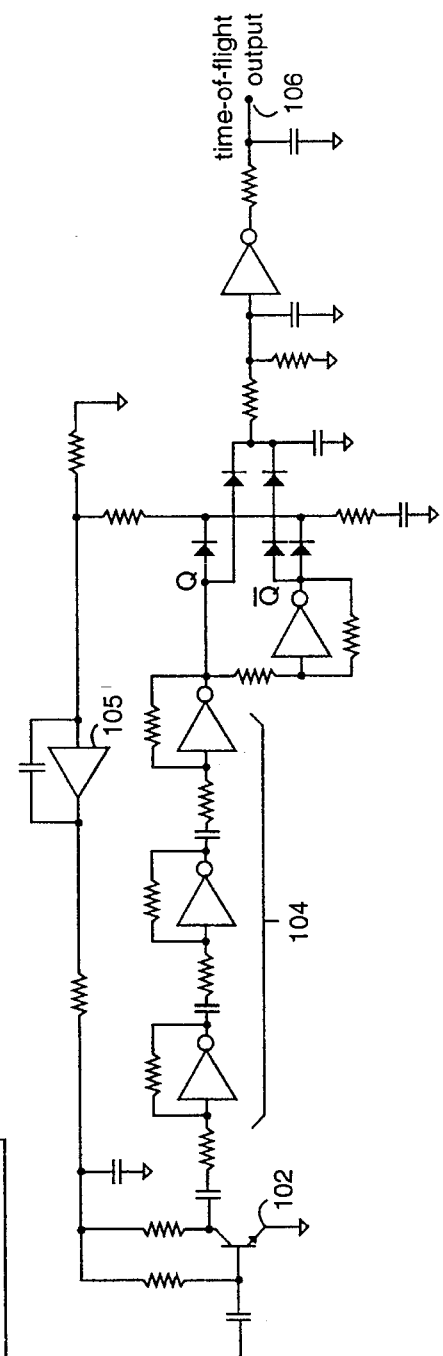

In FIG. 4, a wireless receiver 90, similar to receiver 24 (FIG. 1), provides both power and synchronizing gate pulses to one or more wireless receivers 70. The receiver 90 comprises an antenna 92 for receiving radar pulses, e.g., two gigahertz transmissions from the transmitter 12. A crystal oscillator 94 provides a synchronizing signal for gating the local reception of radar transmissions and the independent reception of the radar transmissions by other receivers, e.g., the receivers 18, 20, and 22 (FIG. 1). The local synchronizing signal is provided by a buffer 96, and the other receivers in the same system are provided their synchronizing signals by a buffer 98. Locally, the radar transmissions are sampled each time a synchronizing gate pulse appears at a diode 100 that provides radio detection. The modulation on the radar transmissions is gated through to a transistor 102 and an amplifier stage 104. An automatic gain control (AGC) 105 helps stabilize the gain such that the pulse amplitudes over many different cycles are all normalized at the output of stage 104. If a radar transmission was received by the antenna 92 when a synchronizing gate pulse was output by the buffer 96, a time-of-flight (TOF) signal will be produced on an output 106.

Figure 5:
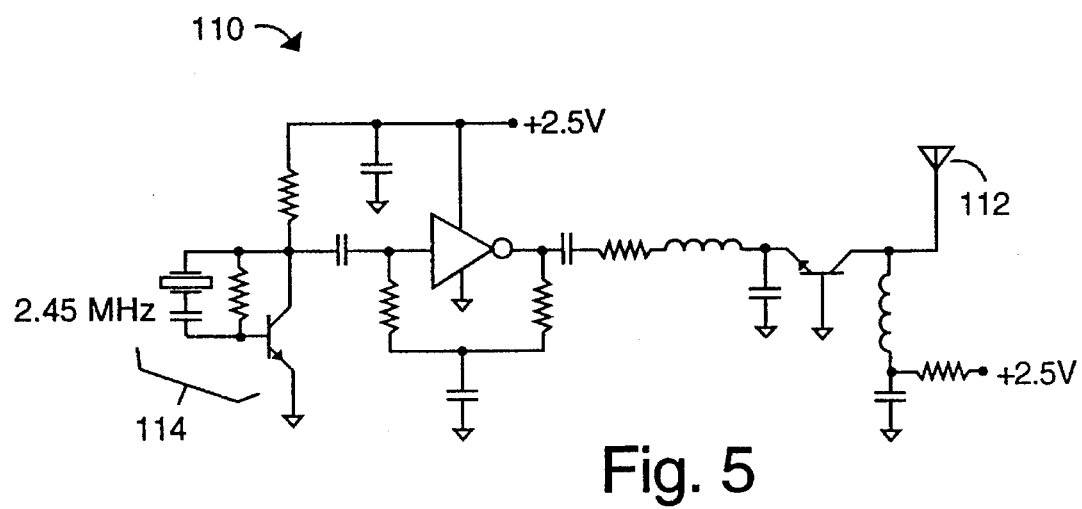
FIG. 5 is a schematic diagram of the transmitter in the short-range radio location system of FIG. 1.

In FIG. 5, a radar transmitter 110, similar to the transmitter 12 (FIG. 1), periodically outputs bursts of a two gigahertz radio frequency (RF) carrier from an antenna 112. A crystal oscillator provides the basic timing for such RF bursts. Preferably, a phase locking device, e.g., PLL 30, phase locks the receiver crystal oscillator 94 to the transmitter crystal oscillator 114, e.g., with an offset of one hundred hertz. The power requirement to operate the radar transmitter 110 is typically on the order of 500 microamperes, so an ordinary small lithium battery is a practical source of mobile power.

A conventional microcomputer can be connected to the TOF outputs 80 and 106 to compute, by triangulation, the position of the transmitter 110, given the known positions of the receivers 70 and 90, and the known lengths of wire used to connect the synchronizing gate signals from the receivers 90 to the several receivers 70. The sliding timing between the two crystal oscillators 94 and 114 provides the situation shown in FIG. 2 where the whole phase range of each transmission period is sampled by the receivers collected by the microcomputer in memory over the course of thousands of such sequential periods. In one embodiment where the transmit and receive timing frequencies are 2.000000 MHz and 2.000100 MHz, respectively, such course repeats each ten milliseconds, wherein there are 20,000 such sample periods.

The present invention is not limited to operating with only four receivers. In particular applications, it may be desirable to string numerous receivers along a corridor, hallway, roadway or room space. Only the four most proximate receivers to the rover would be used to provide triangulation information to yield a three-dimensional fix for the rover.

The present invention is also not limited to operating with radio or radar transmission between the rover 12 and the receivers 18, 20, 22, and 24. For example, the rover 12 may comprise a xenon strobe light that flashes at a fixed period. The receivers 18, 20, 22, and 24 would then necessarily comprise photodetectors to receive the light flashes and then determine the relative geometry. Such a system would then, of course, be susceptible to shadowing.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A radio location system, comprising:

a roving transmitter with an unknown position and providing for periodic bursts of wireless radio frequency (RF) carrier transmissions at a first repetition rate;

a plurality of receivers with known locations and providing for the reception of said bursts of RF carrier transmissions according to a sample gate input for each;

local oscillator generation means connected to provide a single sample gate signal to each of said sample gate inputs at a second repetition rate that is different than said first repetition rate, wherein said first and second repetition rates are in phase once each "n" cycles of said first repetition rate;

digital output means connected to each of the receivers for binary signaling TRUE/FALSE of whether the reception of one of said bursts of said RF carrier transmissions arrived simultaneously with one of said sample gate signals; and computer means for storing representations which of the plurality of receivers and what particular cycles "0 . . . n" of said first repetition rate provided a TRUE binary signal connected from the digital output means, and for computing a relative difference in the time-of-flight of said RF carrier transmissions to each of the plurality of receivers from said stored representations, and for computing a position estimate of the roving transmitter from said relative difference and said known positions of each of the plurality of receivers.

2. The system of claim 1, wherein:

the roving transmitter comprises a crystal oscillator that modulates a microwave radio frequency output stage.

3. The system of claim 1, further comprising:

local oscillator generation means connected to provide a single sample gate signal to each of said sample gate inputs at a second repetition rate that is different than said first repetition rate, wherein said first and second repetition rates are in phase once each "n" cycles of said first repetition rate.

4. The system of claim 1, further comprising:

digital output means connected to each of the receivers for binary signaling TRUE/FALSE of whether the reception of one of said bursts of said RF carrier transmissions arrived simultaneously with one of said sample gate signals.

5. The system of claim 1, further comprising:

computer means for storing representations which of the plurality of receivers and what particular cycles "0 . . . n" of said first repetition rate provided a TRUE binary signal connected from the digital output means, and for computing a relative difference in the time-of-flight of said RF carrier transmissions to each of the plurality of receivers from said stored representations, and for computing a position estimate of the roving transmitter from said relative difference and said known positions of each of the plurality of receivers.

* * * * *